CIRCULAR HALL EFFECT DEVICE

Filed March 26, 1965

INVENTOR.
WILLIAM HONIG

BY Darby & Darby

ATTORNEYS

United States Patent Office 3,304,530

Patented Feb. 14, 1967

3,304,530

CIRCULAR HALL EFFECT DEVICE

William Honig, 6801 Bay Parkway, Brooklyn, N.Y. 11204

Filed Mar. 26, 1965, Ser. No. 443,125
1 Claim. (Cl. 338—32)

This invention relates to Hall effect devices, and in particular, to a thin film Hall effect detector having improved sensitivity. The invention further relates to Hall effect detectors including temperature compensating means for minimizing the effects of temperature or other environmental factors.

The Hall effect is the generation of a voltage when current flows in a conductor at right angles to an applied magnetic field, the voltage generated being perpendicular to both the magnetic field and the current flow. This phenomenon has found practical application as a relatively sensitive magnetic field detector with semi-conductor materials frequently being used as the conductor because of the substantial Hall effect voltages generated in semi-conductors. Conventionally, such semi-conductor materials are formed as a rectangular thin film across which the Hall voltage is measured. A drawback of such prior art devices is the difficulty in suitably placing the output terminals so that no voltage appears at the output in the absence of a magnetic field. Obviously, the presence of such a voltage, due for example to voltage gradients in the semiconductor film because of the current flow, would tend to mask any Hall effect voltage and impair the sensitivity of the device.

An object of the present invention is to provide a thin film Hall effect detector wherein the output terminals may be arranged and balanced to minimize voltage differences not due to the Hall effect.

Another object of the invention is to provide a Hall effect detector of increased sensitivity.

Because Hall detectors are desirably sensitive and accurate devices, and particularly with the high sensitivity detector of the present invention, changes in environmental temperature are likely to produce undesirable fluctuations in the output Hall voltage detrimental to the accuracy of the device. Accordingly, a further object of the invention is to provide an improved method and apparatus for compensating for temperature changes in a Hall effect device.

Figure 1:
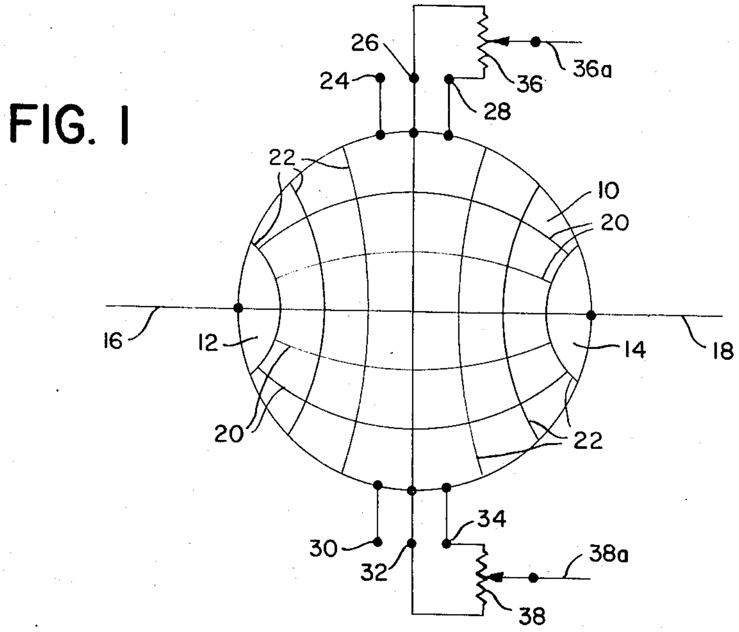
Figure 2:
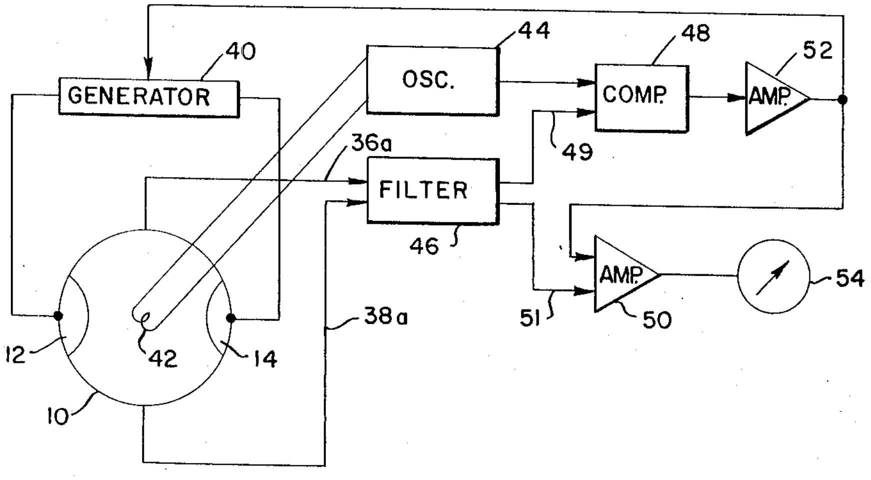

The manner in which the objects of the invention are accomplished is more fully described below with reference to the following drawings, wherein:

FIGURE 1 is a schematic illustration of a Hall effect device in accordance with the invention; and FIGURE 2 is a block diagram illustrating preferred apparatus and methods of compensating for temperature variations.

Referring to FIGURE 1, the Hall detector comprises a thin semi-conductor film 10 which is circular. A pair of conductive contacts with arcuate boundaries 12 and 14 are conductively joined to the semi-conductor film along a common axis at opposite ends of a diameter of thin film 10. Leads 16 and 18 are connected to contacts 12 and 14, respectively. A current source (not shown in FIG. 1) is connected to leads 16 and 18 so that a substantially constant current will flow in film 10 as indicated by the curved lines 20.

The current flow will produce equipotential lines 22 in the thin film 10 which are curved as illustrated. These equipotential lines 22 are arcs of circles whose centers lie along the diameter of the film 10 corresponding to the axis of contacts 12 and 14. Each equipotential line 22 represents a constant electrical potential in the film due to the current flow in the thin film 10. As is known, such circular equipotential lines 22 correspond to those which would exist in a circular thin film fed from a perfect point source.

The Hall detector output terminals may comprise the terminals 24, 26 and 28 cooperating with three opposing terminals 30, 32 and 34. It is not necessary that a plurality of terminals be used at each end of a diameter, but, as explained below, this construction affords certain advantages. The output terminals lie on an axis or diameter of film 10 which is substantially transverse to the common axis of contacts 12 and 14. At each output, any two terminals, for example, terminals 26, 28 and 32, 34 may be bridged by potentiometers 36 and 38, respectively, having slidewires **36*a* and 38*a*** from which the output voltage can be taken.

In the detector as thus far described, the equipotential lines 22 have an increased spread as the lines approach the Hall detector output terminals 24–28 and 30–34. Consequently, it is possible to more accurately calibrate the detector by selecting a pair of output terminals 24–28 and 30–34 which lie on the same equipotential line 22. In this case, the voltage across the selected terminals will be zero with a zero magnetic field. To further increase the accuracy, the bridging resistors 36 and 38 may be used, in which case, by adjusting the slidewires **36*a* and 38*a*, the Hall detector output voltage across output slidewires 36*a* and 38*a* may be further reduced to zero in the absence of a magnetic field. Alternatively it is not necessary to use two separate bridges, and for the latter purpose, one fixed terminal may be used in combination with a pair of terminals across which the bridging potentiometer is connected. In other cases, only two output terminals (e.g., 26 and 32**) will provide sufficiently accurate calibration.

By way of example, the diameter of the thin film 10 may be from three to four inches and the semi-conductor may consist of indium antimonide, in which case a sensitivity of 0.1 microgauss or better may be achieved.

FIGURE 2 illustrates apparatus for the temperature stabilization of the detector illustrated in FIGURE 1. Although this is a preferred construction, any other detector may also be used. For purposes of simplicity, the identical numerals are used in FIGURE 2 to illustrate a component described with reference to FIGURE 1.

A current generator 40 is connected to the lines 16 and 18 to produce the current 20 and the equipotential lines 22 of FIGURE 1. It is this current which interacts with the perpendicular magnetic field to produce a voltage across lines **36*a* and 38*a*** representative of the magnetic field. While current generator could be a D.C. current generator it is preferred that it be an audio frequency generator having a frequency of fifty kc., for example.

A flat coil 42 is placed on top of the thin film 10 and driven by an oscillator 44, which, for example, may have an output frequency of approximately ten kc. This produces a magnetic field at the oscillator frequency across the Hall detector thus generating a Hall voltage at the oscillator frequency across output leads **36*a* and 38*a***.

The output of the current generator may be considered a carrier which is amplitude modulated by the field to be measured and the oscillator frequency. The Hall output will therefore essentially consist of a carrier frequency (fifty kc.) the amplitude of which is dependent on the strength of the low frequency field to be measured, and conventional side band signals having amplitudes dependent upon the ten kc. field produced by oscillator 44. The frequency of the side-band signals will be equal to the carrier frequency plus or minus the frequency of oscillator 44, i.e., forty and sixty kc.

Detector output leads **36*a* and 38*a* are fed to a filter 46 which separates the fifty kc. carrier from the selected side band frequency (either of which may be used). The side band signal is fed via line 49 to one input of a comparator 48. Comparator 48 is also responsive to the output of oscillator 44 and produces an error voltage which is coupled to amplifier 52 for control purposes. Since the side band signal on line 49 will be dependent on the magnetic field produced by oscillator 44 and coil 42, any change in the voltage on line 49 will cause comparator 48 to generate an error voltage. Therefore, if the detector is affected by temperature, or any other change in environment, comparator 48 will produce an error voltage which may be used in various ways to compensate for such change. In cases where the output of oscillator 44 is very stable, the comparator 48 is not necessary and the side band signal on line 49** may be used directly for control purposes as explained below.

An amplifier 50 is responsive to the carrier signal separated by filter 46 and coupled on to line 51. Since the field to be measured is a relatively low frequency field, the filter carrier signal on line 51 will be amplitude modulated by the frequency of the signal to be measured. Thus, if desired, amplifier 50 may include a conventional detector to measure the relative magnitude of this field and to enable manifestation thereof on meter 54.

The error voltage from comparator 48 may be used in various ways to compensate for temperature changes. In one case, the error voltage from amplifier 52 may be fed back to the current generator 40 to control the output thereof. Thus, if a temperature change has decreased the Hall output voltage from a fixed reference, generator 40 will supply more current to bring the output back to the reference level. Similarly, the generator output will be decreased to correct for undesired increases in the Hall voltage.

Another way to correct the system is to use the error voltage from amplifier 52 to control the gain of detector amplifier 50, which for this purpose would be a standard variable gain amplifier. In using either of the above configurations, the reference point should first be located on meter 54 in the absence of the magnetic field to be measured. If desired, a combination of the two controls could also be used.

The apparatus in FIGURE 2 may also be used to locate the point corresponding to a zero magnetic field without concern for the accurate placement of the output terminals **36*a* and 38*a*. For this purpose, when no external magnetic field is present, the gain of amplifier 52 is set to produce a zero reading on indicator 54**. Thereafter, in the presence of a field to be measured, the indicator will remain properly calibrated with respect to the initially located point.

Although preferred embodiments of the invention have been illustrated and described, many modifications thereof will be obvious to those skilled in the art and the invention should not be limited except as defined in the following claim.

What is claimed is:

A Hall effect device, comprising a circular thin film of semiconductor material, two opposing current drive contact members electrically contacting said thin film at the ends of a diameter thereof, said contacts comprising segments of respective circular discs having their centers falling substantially on extensions of said diameter exterior of said circular thin film, said contacts each having a radius of curvature less than the radius of said thin film, the circular portions of said contacts defining equipotential lines, said contacts being spaced with respect to each other so that the equipotential lines existing in said thin film due to current flow between said contacts are substantially circular, with the maximum spread between said equipotential lines occurring at the opposing ends of the diameter transverse to said first named diameter, and output terminals electrically connected to said thin film at said opposing ends.

References Cited by the Examiner

UNITED STATES PATENTS

| | | | |
|---|---|---|---|
| 2,754,431 | 7/1956 | Johnson | 317—234 |
| 2,869,001 | 1/1959 | Welker | 307—88.5 |
| 2,990,513 | 6/1961 | Arnold | 324—43 |
| 2,997,648 | 8/1961 | Bozorth | 324—43 |
| 3,162,805 | 12/1964 | Robertson | 324—45 |
| 3,214,609 | 10/1965 | Drew et al. | 307—88.5 |

WALTER L. CARLSON, *Primary Examiner.*

RICHARD B. WILKINSON, *Examiner.*

R. J. CORCORAN, *Assistant Examiner.*